US011741820B1

(12) United States Patent
Bacco et al.

(10) Patent No.: US 11,741,820 B1
(45) Date of Patent: Aug. 29, 2023

(54) AERIAL SURVEILLANCE FOR PREMISES SECURITY SYSTEMS

(71) Applicant: The ADT Security Corporation, Boca Raton, FL (US)

(72) Inventors: Edward M. Bacco, Lopez Island, WA (US); Philippe Sawaya, New York, NY (US); Scott William Schmidt, Newport, WA (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/089,901

(22) Filed: Dec. 28, 2022

(51) Int. Cl.
*G08B 25/00* (2006.01)
*H04B 7/185* (2006.01)

(52) U.S. Cl.
CPC ....... *G08B 25/001* (2013.01); *H04B 7/18504* (2013.01)

(58) Field of Classification Search
CPC .......................... G08B 25/001; H04B 7/18504
See application file for complete search history.

(56) References Cited

U.S. PATENT DOCUMENTS

| 8,639,396 | B1 | 1/2014 | Hirsch et al. |
| 9,051,043 | B1 | 6/2015 | Peeters et al. |
| 10,665,070 | B1* | 5/2020 | Picardi .................. G08B 31/00 |
| 10,752,355 | B1 | 8/2020 | Flick |
| 10,768,625 | B2 | 9/2020 | Rezvani |
| 11,176,793 | B1* | 11/2021 | Picardi .................. G06N 3/045 |
| 11,253,736 | B2 | 2/2022 | Raucher |
| 2017/0187993 | A1 | 6/2017 | Martch et al. |
| 2019/0347924 | A1 | 11/2019 | Trundle et al. |
| 2021/0004910 | A1* | 1/2021 | Trundle ................. G06Q 40/08 |
| 2021/0027602 | A1* | 1/2021 | Correnti ............... G08B 29/188 |
| 2021/0168622 | A1* | 6/2021 | Hong .................... H04W 16/22 |
| 2022/0076549 | A1* | 3/2022 | Weingart ......... G08B 13/19645 |
| 2023/0010479 | A1* | 1/2023 | Vrind ..................... H04W 4/70 |

* cited by examiner

*Primary Examiner* — Ojiako K Nwugo
(74) *Attorney, Agent, or Firm* — Christopher & Weisberg, P.A.

(57) ABSTRACT

A method implemented by a system for security comprising an unmanned aerial vehicle (UAV) and an analytics device configured to communicate with a remote monitoring system and the UAV is provided. Media data from the UAV is received at an analytics device, where the media data includes surveillance information corresponding to a premises under surveillance. Security attributes associated with the premises are detected based at least in part on a first level of machine learning (ML) analysis performed on the media data. The media data are transmitted by the analytics device to the remote monitoring system for a second level of ML analysis based at least in part on the security attribute, where the first level of ML analysis is less computationally expensive compared to the second level of ML analysis, and the second level of ML analysis is performed at the remote monitoring system on the media data.

20 Claims, 5 Drawing Sheets

AERIAL SURVEILLANCE FOR PREMISES SECURITY SYSTEMS

TECHNICAL FIELD

The present technology is generally related to supporting configurations for aerial surveillance in premises security systems.

BACKGROUND

Premises security systems typically include several sensors that may detect various conditions, such as an open door, smoke, or carbon monoxide. Many premises security systems are monitored by a remote monitoring center. When a sensor in a premises security system indicates an anomaly, such as a fire or burglary, the remote monitoring center may be notified of the event. In response, the remote monitoring center may attempt to contact a person associated with the premises, such as a facilities manager or a homeowner, to determine whether the anomaly requires assistance from first responders, such as law enforcement or firefighters. If the remote monitoring center is unable to contact the person associated with the premises, or if the person associated with the premises is unable to confirm that assistance from first responders is unnecessary, the remote monitoring center may request that first responders be dispatched to the premises to investigate the potential anomaly.

BRIEF DESCRIPTION OF THE DRAWINGS

Many aspects of the present disclosure may be better understood with reference to the following drawings. The components in the drawings are not necessarily to scale, with emphasis instead being placed upon clearly illustrating the principles of the present disclosure. In the drawings, like reference numerals designate corresponding parts throughout the drawings.

DETAILED DESCRIPTION

Figure 1:
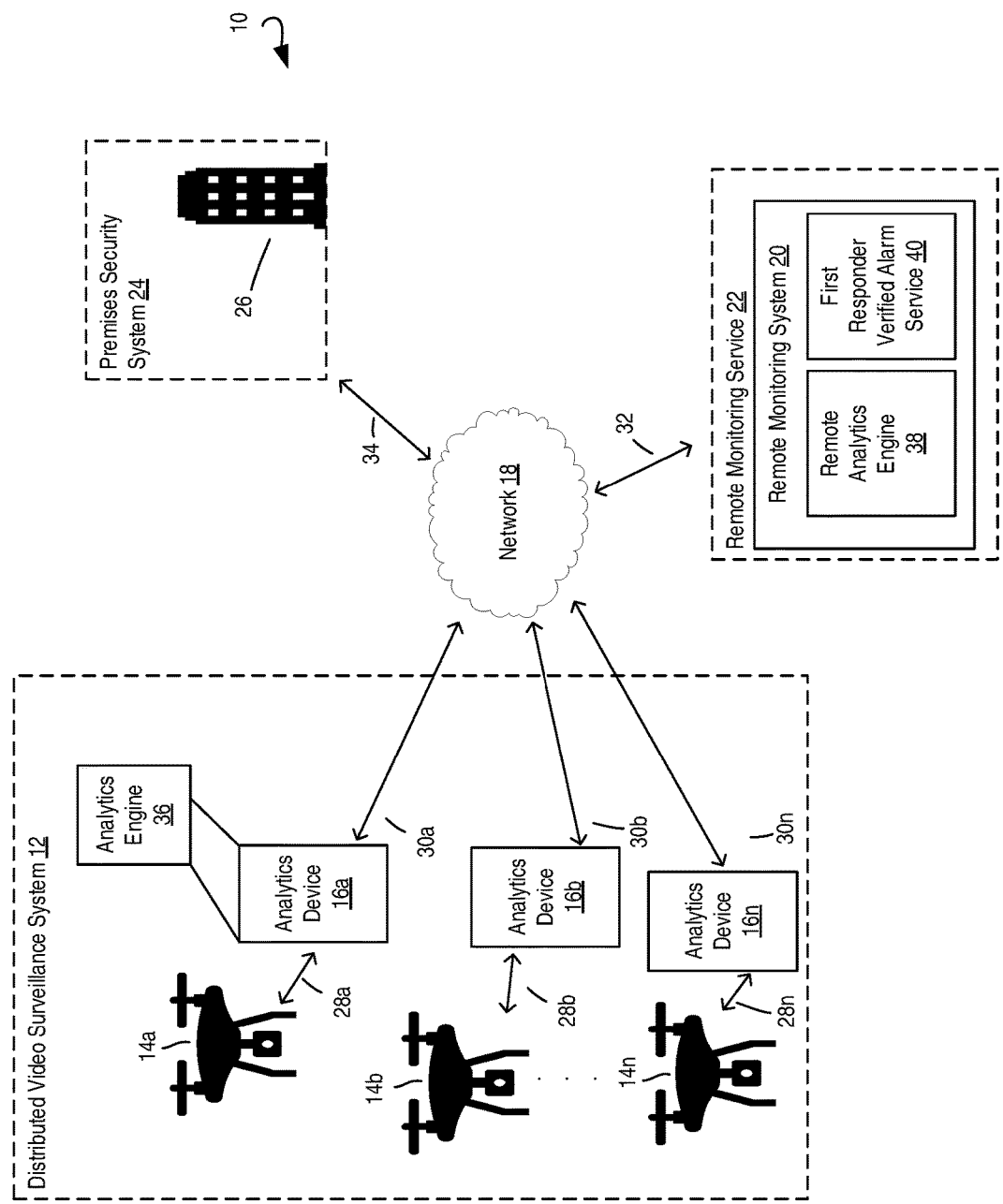
FIG. 1 is a diagram of an example system comprising a system including a distributed video surveillance system according to various embodiments of the present disclosure.

Referring to the drawing figures there is shown in FIG. 1 a system designated generally as "10." System 10 may be a system for security. System 10 may include distributed video surveillance system 12, where distributed video surveillance system 12 includes and/or is associated with a plurality of unmanned aerial vehicles (UAVs) 14a to 14n (collectively referred to as "UAV 14"), and one or more analytics devices 16a to 16n (collectively referred to as "analytics device 16"). The system 10 further comprises a network 18, and a remote monitoring system 20 associated with a remote monitoring service 22. The system 10 may include a premises security system 24 associated with a premises 26 (e.g., a building, worksite, factory, distribution hub, warehousing facility, university campus, etc.), which may include various alarms, sensors, automated patrols, etc., and which may include computing and/or networking hardware and/or software for sending and receiving packets and other signaling corresponding to premises security system information (alerts, alarms, notification, sensor data, configuration information, UAV 14 data, analytics device 16 data, etc.) with other entities in system 10.

Remote monitoring system 20 may generate remote monitoring service alerts, e.g., as configured and/or instructed by remote monitoring service 22.

UAV 14 may be in communication with analytics device 16 via one or more communication channels 28a to 28n (collectively referred to as "communication channel 28"), which may be wired or wireless communication channels. Further, any one of the UAVs 14 and analytics devices 16 may indirectly communicate with one another, e.g., via network 18.

Analytics device 16 may be in communication with network 18 via one or more communication channels 30a to 30n (collectively referred to as "communication channel 30"), which may be wired or wireless communication channels. Further, any one of the analytics devices 16 may indirectly communicate with other entities in system 10, e.g., remote monitoring system 20, premises security system 24, etc., via network 18.

Remote monitoring system 20 and/or remote monitoring service 22 may be in communication with network 18 (and/or one or more other entities of system 10) via communication channel 32, which may be a wired or wireless communication channel.

Premises security system 24 may be in communication with network 18 (and/or one or more other entities of system 10) via communication channel 34, which may be a wired or wireless communication channel.

UAV 14 may be any type of unmanned aerial vehicle. For example, UAV 14 may be configured to transport packages and/or to collect information about the environment in which it operates (e.g., video surveillance, audio surveillance, biological, biometric, gas and/or chemical sensor surveillance, etc.). UAV 14 may be configured for communicating with other entities in the distributed video surveillance system 12 and/or system 10. UAV 14 may be configured for autonomously responding to security alerts, e.g., according to a preconfigured algorithm, and/or according to instructions received by another entity in the distributed video surveillance system 12 (e.g., analytics device 16, other UAVs 14) and/or another entity in system 10 (e.g., remote monitoring system 20, premises security system 24, etc.). UAVs 14 may include one or more types of sensors, e.g., motion sensors, fire sensors, biometric sensors, chemical sensors, gas sensors, image capture devices, microphones, among other sensor types. Image capture devices may include a still camera and/or video camera, among other image capture devices. The image capture devices may include, for example, visible light cameras, non-visible light cameras, thermal imaging cameras, (IR) infrared cameras, near-infrared (NIR) cameras, visible and near-infrared (VNIR) cameras, short-wave infrared (SWIR) cameras, and/or other types of cameras.

The UAVs 14 may be dispersed geographically throughout an area. For example, a particular UAV 14 or set of UAVs 14, and the corresponding analytics device(s) 16, may be located and configured to operate in a particular city or neighborhood, while another UAV 14 or set of UAVs 14, and the corresponding analytics device(s) 16, are located and configured to operate in another city or neighborhood. In some embodiments, one of more UAVs 14 may be dispatched to the premises 26 in response to the premises security system 24 detecting an anomaly and/or emergency at the premises 26. For example, the premises security system 24 may receive information from a smoke detector indicating that smoke has been detected in the premises 26. The premises security system 24 may notify the remote monitoring system 20 and/or remote monitoring service 22 that smoke has been detected, and the remote monitoring system 20 may cause one or more UAVs 14 within operating range of the premises 26 to fly to the premises 26 and obtain information, such as video of the premises 26. The information obtained by the UAV 14 may be provided to the analytics device 16 and processed as described herein. For example, the analytics device 16 which obtains and processes the information may be an analytics device 16 which is associated with the UAV 14 and/or which may be located within a configured radius of UAV 14. Analytics device 16 may be selected by UAV 14 from a plurality of analytics device 16, e.g., based at least in part on a current or predicted processing load of the analytics device 16, processing capability of analytics device 16, a proximity of the analytics device 16 to UAV 14, other characteristics of analytics device 16, of UAV 14, of communication channel 28, and/or of communication channel 30, etc.

In various embodiments, UAV 14 may respond to a security alert received from one or more of analytics device 16, remote monitoring system 20, premises security system 24, etc., e.g., by traversing to a location associated with the security alert. UAV 14 may be configured for communicating with and/or interacting with people and/or objects in the environment. For example, the UAV 14 may be configured for following and/or tracking a person (e.g., a suspected intruder) throughout or along the premises 26 in response to a security alert received from and/or associated with the premises security system 24. UAV 14 may be configured to communicate with and/or coordinate with other UAVs 14, e.g., a plurality of UAV 14 may be configured to operate as a swarm of UAVs 14 within the distributed video surveillance system 12.

Analytics device 16 may be a computing device configured for sending, processing, and receiving signaling with one or more UAVs 14 in distributed video surveillance system 12. For example, analytics device 16 may be configured for receiving signaling, such as data, control information, flight instructions, location information, sensor configuration information, information regarding other UAVs 14, security alerts, etc., directly and/or indirectly from remote monitoring system 20 (e.g., via network 18), and/or from other entities of system 10 (e.g., premises security system 24, other analytics devices 16, etc.). Analytics device 16 may forward at least some of the received signaling to one or more UAVs 14. Alternatively, analytics device 16 may translate at least some of the received information into another format and may transmit at least some of the translated information to one or more UAVs 14.

Analytics device 16 may be further configured for receiving signaling from one or more UAVs 14, such as sensor information (e.g., video surveillance data, image data, audio data, etc.), location information, flight hardware information, diagnostic information, etc. A particular analytics device 16*a* may send and/or receive signaling with one or more UAVs 14*a,* while another analytics device 16*b* may send and/or receive signaling with one or more UAVs 14*b*.

Multiple UAVs 14 may send and/or receive signaling with one or more analytics devices 16. Which analytics device 16*a* a particular UAV 14*a* communicates with at a particular time may depend on a variety of factors, such as the location of the UAV 14*a* relative to the analytics device 16, the signal channel quality and/or bandwidth (e.g., of communication channel 28) between the particular analytics device 16*a* and the UAV 14*a,* a processing load at the analytics device 16*a,* etc. In some embodiments, particular analytics devices 16 may be assigned to and/or associated with particular UAVs 14 based at least in part on a network configuration, e.g., determined and/or transmitted by the remote monitoring system 20.

Analytics device 16 may include analytics engine 36, which may provide one or more analytics functions, such as video analytics functions, including but not limited to object detection, person detection, activity detection, facial recognition, security event detection, etc., "acoustic" or "audio" analytics, including but not limited to the detection of gunshots, glass breaking, shouts, distress, other sensor analytics functions, including but not limited to detecting the presence of dangerous chemicals, gas, etc., and other indicators of violent or dangerous to life activity, biometric analytics functions, etc. According to various embodiments, the analytics functions may be based at least in part on video, images, audio, sensor data, etc., received from one or more UAVs 14. For example, analytics engine 36 may use one or more machine learning (ML) models for detecting objects, people, items, damage, intrusion, etc., in video surveillance data received from one or more UAVs 14. Analytics engine 36 may utilize one or more machine learning (ML) models (and/or other AI techniques) for detecting objects, activities, people, items, damage (broken windows), intrusion (open doors, etc.), and other entities in the environment of the UAVs 14 based on data (e.g., video surveillance data, sensor data, etc.) received from one or more UAVs 14. Analytics engine 36 may utilize ML models (and/or other AI techniques) for classifying and/or labeling the detected objects, people, items, damage, intrusion, etc., based on the data received from the UAVs 14. Analytics engine 36 may utilize ML models (and/or other AI techniques) for determining whether an alarm should be triggered, whether to escalate an ongoing alarm to a higher priority and/or severity level, whether to deactivate an alarm, etc., based at least in part on data received from the one or more UAVs 14. In some embodiments, the ML models may also utilize data received from other entities of system 10, such as premises security system 24, other analytics devices 16, etc. The ML models may be preconfigured, and/or may be received from one or more other entities of system 10, e.g., remote monitoring system 20, premises security system 24, etc. In some embodiments, analytics device 16 may perform at least one AI function in response to receiving a security alert from another entity in system 10, e.g., remote monitoring system 20, another analytics device 16, premises security system 24, etc.

While analytics device 16 is illustrated in FIG. 1 as being a separate device, in one or more embodiments, analytics device 16 may be integrated with and/or co-located with one or more premises security systems 24 and/or another entity of system 10.

Network 18 may be a public and/or private network, internet, intranet, enterprise network, public land mobile network, etc., through which packets and/or other signaling may be transmitted among entities of system 10 and other entities, servers, services, etc.

Remote monitoring system 20 may be a computer, server, and/or network node, which may provide various premises security control services, monitoring services, event notification services, AI and/or ML services, and/or communication services. In various embodiments, the remote monitoring system 20 may include multiple server computing devices, which may be located in a single installation or distributed among multiple different geographical locations. In some embodiments, the remote monitoring system 20 may be a scalable virtualized computing instance in which allocated computing resources may be dynamically adjusted based on computing workload or other factors. In some embodiments, remote monitoring system 20 is associated with a remote monitoring service 22, e.g., of an alarm monitoring company. In some embodiments, the remote monitoring system 20 is dedicated to providing remote monitoring service 22, including computing services, for a particular customer. In other embodiments, the remote monitoring system 20 provides computing services for many customers that have contracted for remote monitoring service 22 with an alarm monitoring company.

Remote monitoring system 20 may include remote analytics engine 38 configured for providing one or more analytics functions, such as video analytics function, including but not limited to object detection, activity detection, person detection, facial recognition, security event detection, etc., audio analytics functions, sensor analytics functions, etc. According to various embodiments, the analytics functions may be based on video, images, audio, sensor data, etc., received from one or more UAVs 14, for example, via one or more of analytics device 16, network 18, premises security system 24, etc. For example, remote analytics engine 38 may utilize one or more machine learning (ML) models for detecting objects, people, items, damage, intrusion, activity, etc., in video surveillance data received from one or more UAVs 14, for example, via one or more of analytics device 16, network 18, premises security system 24, etc. Remote analytics engine 38 may utilize one or more machine learning (ML) models (and/or other AI techniques) for detecting objects, people, items, damage (broken windows), intrusion (open doors, etc.), and other entities in the environment of the UAVs 14 based at least in part on data (e.g., video surveillance data, audio data, sensor data, etc.) received from one or more UAVs 14, for example, via one or more of analytics device 16, network 18, premises security system 24, etc. Remote analytics engine 38 may utilize ML models (and/or other statistical models and/or other AI techniques) for classifying and/or labeling the detected objects, people, items, damage, intrusion, etc., based at least in part on the data received from the UAVs 14, for example, via one or more of analytics device 16, network 18, premises security system 24, etc. Remote analytics engine 38 may utilize ML models (and/or other AI techniques) for determining whether an alarm should be triggered, whether to escalate an ongoing alarm to a higher priority and/or severity level, whether to deactivate an alarm, etc., based at least in part on data received from the one or more UAVs 14, for example, via one or more of analytics device 16, network 18, premises security system 24, etc. The ML models may be preconfigured, and/or may be received from one (and/or updated or modified by) or more other entities of system 10 (e.g., remote monitoring system 20, etc.). In some embodiments, remote analytics engine 38 may perform at least one AI function in response to the remote monitoring system 20 receiving an indication for example, from one or more of analytics device 16, premises security system 24, etc., indicating a security event or emergency (e.g., a broken window, smoke, a crowd of people, an intruder, etc.).

Remote monitoring system 20 may include a first responder verified alarm service 40, which receives, verifies, and/or generates first responder verified alarms (e.g., 911 emergency calls, alerts, etc.). For example, remote monitoring system 20 may be configured to receive an alert or alarm (e.g., a data packet containing alarm information according to a predefined format) from a third-party and/or first responder service (e.g., a government-operated 911 call service). The remote monitoring system 20, via first responder verified alarm service 40, may be configured to verify the alarm, to convert the alarm into another format for another entity of system 10, and/or to determine a premises 26 associated with the alarm. The remote monitoring system 20, via first responder verified alarm service 40, may be configured to perform one or more actions (e.g., notifying premises security system 24 of premises 26, notifying analytics device 16, instructing analytics device 16 and/or UAVs 14 to further investigate the alarm at premises 26, etc.).

Remote monitoring system 20 may be located in one or more premises 26 associated with system 10, or may be located in a separate premises 26, such as in a cloud data center, server farm, etc. Thus, the term "remote" as used herein refers to the remote monitoring system 20 being at one or more locations separate from the location of analytics device 16 for a UAV 14, but does not limit the location of the remote monitoring system 20 with respect to any other entity of system 10.

Example implementations, in accordance with one or more embodiments, of analytics device 16 discussed in the preceding paragraphs will now be described with reference to FIG. 2.

The system 10 includes an analytics device 16 that includes hardware 42 enabling the analytics device 16 to communicate with one or more entities in system 10 and to perform one or more functions described herein. The hardware 42 may include a communication interface 44 for setting up and maintaining at least a wired and/or wireless connection (e.g., communication channel 28, communication channel 30, etc.) to one or more entities in system 10 such as UAVs 14, network 18, remote monitoring system 20, premises security system 24, other analytics devices 16, etc.

In the embodiment shown, the hardware 42 of the analytics device 16 further includes processing circuitry 46. The processing circuitry 46 may include a processor 48 and a memory 50. In particular, in addition to or instead of a processor, such as a central processing unit, and memory, the processing circuitry 46 may comprise integrated circuitry for processing and/or control, e.g., one or more processors, processor cores, field programmable gate arrays (FPGAs) and/or application specific integrated circuits (ASICs) adapted to execute instructions. The processor 48 may be configured to access (e.g., write to and/or read from) the memory 50, which may comprise any kind of volatile and/or nonvolatile memory, e.g., cache, buffer memory, random access memory (RAM), read-only memory (ROM), optical memory and/or erasable programmable read-only memory (EPROM).

Thus, the analytics device 16 further has software 51 stored internally in, for example, memory 50, or stored in external memory (e.g., database, storage array, network storage device, etc.) accessible by the analytics device 16 via an external connection. The software 51 may be executable by the processing circuitry 46. The processing circuitry 46 may be configured to control any of the methods and/or processes described herein and/or to cause such methods, and/or processes to be performed, e.g., by analytics device 16. Processor 48 corresponds to one or more processors 48 for performing analytics device 16 functions described herein. The memory 50 is configured to store data, programmatic software code and/or other information described herein. In some embodiments, the software 51 may include instructions that, when executed by the processor 48 and/or processing circuitry 46, causes the processor 48 and/or processing circuitry 46 to perform the processes described herein with respect to analytics device 16. For example, processing circuitry 46 of the analytics device 16 may include analytics engine 36 which is configured to perform one or more analytics device 16 functions described herein such as with respect to supporting AI configurations in a distributed video surveillance system 12.

According to various embodiments, analytics device 16 may be embodied in the form of a fanless computing device housed within a single enclosure. Processing circuitry 46 and/or processor 48 of analytics device 16 may include a graphics processing unit (GPU) configured to facilitate analytics operations, such as object or activity detection in video or image data. The computing processing capabilities, including data analytics capabilities, of analytics device 16 may be less than the computing processing capabilities of the remote monitoring system 20. As such, the level of analytics processing performed by analytics device 16 may be less extensive and/or computationally expensive than the level of analytics processing performed by the remote monitoring system 20.

Example implementations, in accordance with one or more embodiments, of remote monitoring system 20 discussed in the preceding paragraphs will now be described with reference to FIG. 3.

The system 10 includes a remote monitoring system 20 that includes hardware 52 enabling the remote monitoring system 20 to communicate with one or more entities in system 10 and to perform one or more functions described herein. The hardware 52 may include a communication interface 54 for setting up and maintaining at least a wired and/or wireless connection (e.g., communication channel 32, etc.) to one or more entities in system 10 such as UAVs 14, network 18, premises security system 24, other remote monitoring systems 20, analytics devices 16, etc.

In the embodiment shown, the hardware 52 of the remote monitoring system 20 further includes processing circuitry 56. The processing circuitry 56 may include a processor 58 and a memory 60. In particular, in addition to or instead of a processor, such as a central processing unit, and memory, the processing circuitry 56 may comprise integrated circuitry for processing and/or control, e.g., one or more processors, processor cores, field programmable gate arrays (FPGAs), and/or application specific integrated circuits (ASICs) adapted to execute instructions. Processing circuitry 56 and/or processor 58 of the remote monitoring system 20 may include one or more GPUs to facilitate training and/or application of analytics models. The processor 58 may be configured to access (e.g., write to and/or read from) the memory 60, which may comprise any kind of volatile and/or nonvolatile memory, e.g., cache, buffer memory, random access memory (RAM), read-only memory (ROM), optical memory and/or erasable programmable read-only memory (EPROM).

Thus, the remote monitoring system 20 further has software 62 stored internally in, for example, memory 60, or stored in external memory (e.g., database, storage array, network storage device, etc.) accessible by the remote monitoring system 20 via an external connection. The software 62 may be executable by the processing circuitry 56. The processing circuitry 56 may be configured to control any of the methods and/or processes described herein and/or to cause such methods, and/or processes to be performed, e.g., by remote monitoring system 20. Processor 58 corresponds to one or more processors 58 for performing remote monitoring system 20 functions described herein. The memory 60 is configured to store data, programmatic software code and/or other information described herein. In some embodiments, the software 62 may include instructions that, when executed by the processor 58 and/or processing circuitry 56, causes the processor 58 and/or processing circuitry 56 to perform the processes described herein with respect to remote monitoring system 20. For example, processing circuitry 56 of the remote monitoring system 20 may include remote analytics engine 38 which is configured to perform one or more remote monitoring system 20 functions described herein such as with respect to supporting AI configurations in a system 10. As another example, processing circuitry 56 of the remote monitoring system may include first responder verified alarm service 40, which is configured to perform one or more remote monitoring system 20 functions described herein such as with respect to supporting first responder verified alarm configurations in a system 10.

Figure 2:
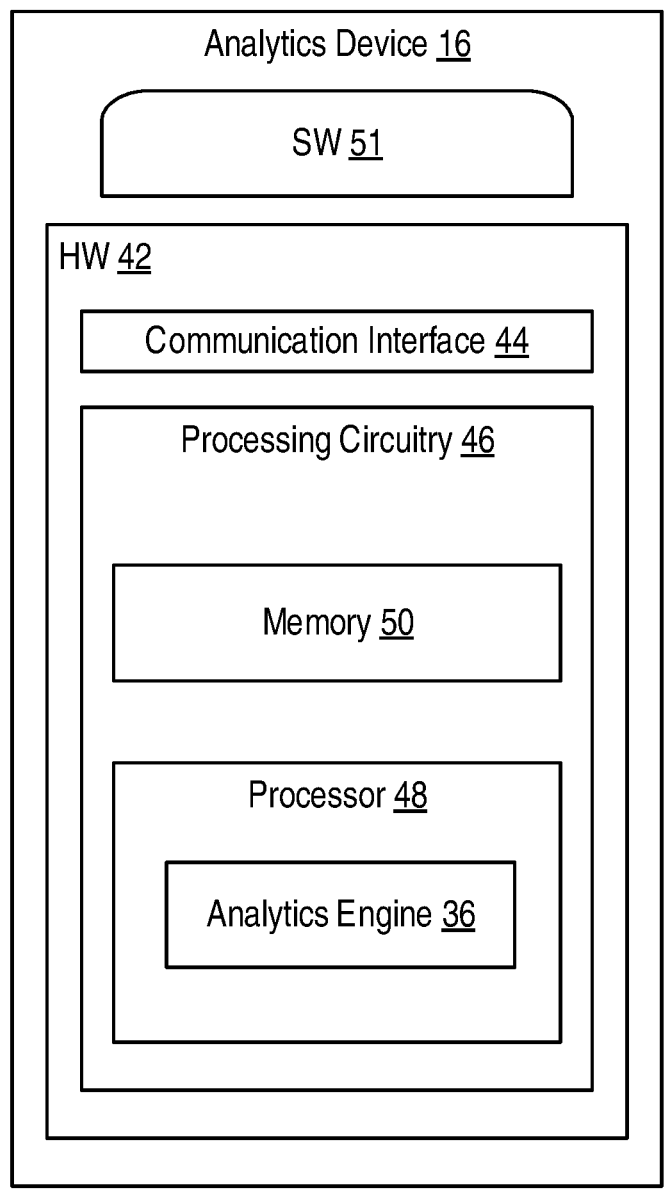
FIG. 2 is a diagram of an example of an analytics device in the system of FIG. 1 according to various embodiments of the present disclosure.
Figure 3:
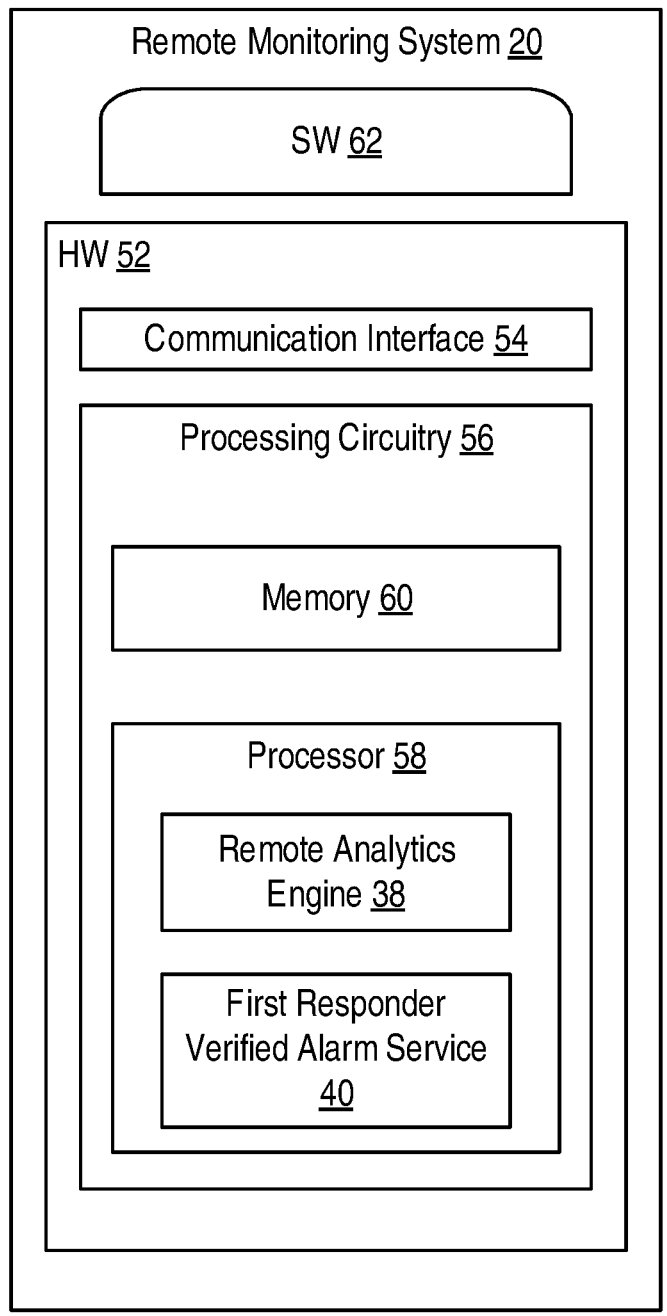
FIG. 3 is a diagram of a remote monitoring system in the system of FIG. 1 according to various embodiments of the present disclosure.

Although FIGS. 1, 2, and 3 show analytics engine 36, remote analytics engine 38, and first responder verified alarm service 40 as being within a respective processor, these units and engines may be implemented such that a portion of the unit is stored in a corresponding memory within the processing circuitry. In other words, the unit may be implemented in hardware or in a combination of hardware and software within the processing circuitry.

In some embodiments, the analytics device 16 may be configured to perform a first level (and/or layer, step, etc.) of analytics, such as ML analysis, and the remote monitoring system 20 may be configured to perform a second level (and/or layer, step, etc.) of analytics, such as AI analysis. In some embodiments, a first level of analytics performed at the analytics device 16 may be less computationally extensive than a second level of analytics performed at the remote monitoring system 20 on the same or similar media data (e.g., video files). For example, the first level of analytics may utilize and/or require less computation time and/or fewer computation resources (e.g., processors, processor cores, processing units, registers, cache memory, random access memory, bandwidth, etc.), whereas the second level of analytics may utilize and/or require relatively more computation time and/or more computation resources. For example, the first level of analytics may utilize a less complex ML model or statistical model (e.g., using fewer parameters, weights, neural network layers, etc.), whereas the second level of analytics may utilize a more complex ML model or statistical model. This may be advantageous, e.g., where analytics device 16 has a lower capability processing circuitry 46 (e.g., slower speed, less energy intensive, fewer processing resources, etc.) than the processing circuitry 56 of remote monitoring system 20. Remote monitoring system 20, for instance, may be able to utilize a data center, server farm, distributed computer system, etc., to increase and/or scale processing and/or computational resources as needed, whereas analytics device 16 may be limited to utilizing processing circuitry 46. Thus, in some embodiments, the second level of analytics may result in more accurate detections, more detailed analyses and/or predictions, and/or faster analyses and/or predictions than the first layer of ML analysis. Further, by only sending surveillance footage (or other media data) to the remote monitoring system 20 when certain conditions are met (e.g., when the predicted risk of a security breach is above a threshold probability, such as 30%), transmission resources may be conserved, e.g., by avoiding the unnecessary transmission from analytics device 16 to remote monitoring system 20 of surveillance footage which is of minimal or no security relevance.

Figure 4:
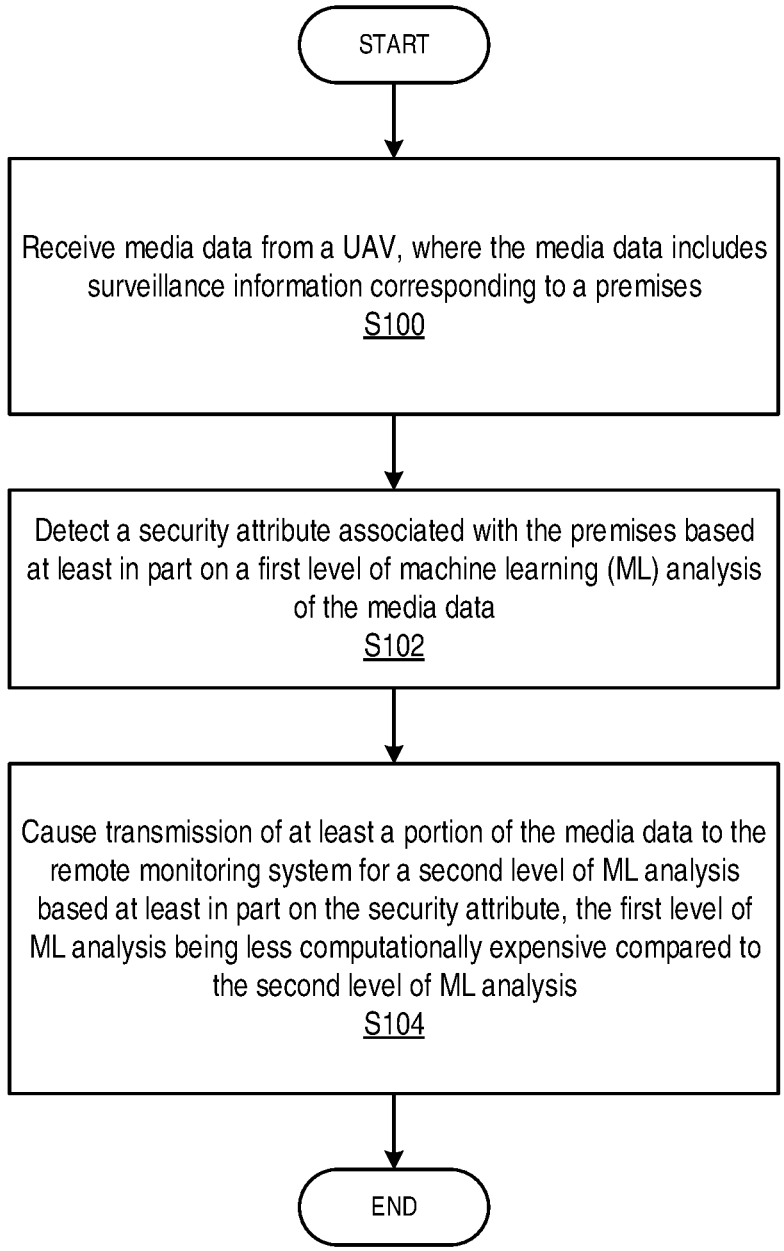
FIG. 4 is a flowchart of an example process in the analytics device of FIG. 2 according to various embodiments of the present disclosure.

FIG. 4 is a flowchart of an example process in an analytics device 16 according to one or more embodiments of the present invention. One or more blocks described herein may be performed by one or more elements of analytics device 16, such as by one or more of processing circuitry 46 (including the analytics engine 36), processor 48, etc. Analytics device 16 is configured to communicate with a remote monitoring system 20 and a UAV 14, which may be one UAV 14 of a plurality of UAVs 14 in a system 10. One or more blocks described herein may be performed by one or more elements of analytics device 16 such as by one or more of processing circuitry 46 (including the analytics engine 36), processor 48, etc. Analytics device 16 is configured to receive (Block S100) media data from a UAV 14, where the media data includes surveillance information corresponding to a premises 26 (e.g., a premises 26 associated with a premises security system 24). Analytics device 16 is configured to detect (Block S102) a security attribute associated with the premises 26 based at least in part on a first level of machine learning (ML) analysis of the media data. Analytics device 16 is configured to cause transmission (Block S104) of at least a portion of the media data to the remote monitoring system 20 for a second level of ML analysis based at least in part on the security attribute, the first level of ML analysis being less computationally expensive compared to the second level of ML analysis.

In some embodiments, the analytics device 16 is further configured to determine an alarm probability level associated with the security attribute, and to transmit at least the portion of the media data to the remote monitoring system 20 only when the alarm probability level exceeds a preconfigured threshold (e.g., configured by remote monitoring system 20, by a user, by a manufacturer, distributer, etc.). For example, in some embodiments, the second level of ML analysis is only performed at the remote monitoring system 20 if the analytics device 16 determines there is at least an X percent likelihood that an alarm condition exists, e.g., to avoid false positives, to avoid consuming network 18 bandwidth, to avoid wasting processing resources at remote monitoring system 20, etc. In some embodiments, analytics device 16 may transmit the security attribute and/or an indication thereof to the remote monitoring system 20, e.g., along with the media data and/or in a separate signaling.

In some embodiments, the analytics device 16 is further configured to receive a security alert from the remote monitoring system 20 indicating a premises area associated with the premises 26. For example, a premises alarm device of a premises security system 24 (e.g., window sensor, door sensor, motion sensor, etc.) in a premises area may trigger an alert (e.g., by premises security system 24) which is received by remote monitoring system 20, e.g., via network 18. As another example, remote monitoring system 20 may receive and/or determine a first responder verified alarm (e.g., via first responder verified alarm service 40), and may be configured to determine a premises 26 and/or premises area of premises 26 associated with the alarm. The remote monitoring system 20 may thus dispatch elements of the system 10 to investigate (e.g., based on a preconfigured automated dispatch function in remote monitoring system 20 and/or input by a user of remote monitoring system 20). Responsive to receiving the security alert, analytics device 16 is further configured to cause transmission of an indication to the UAV 14 for the UAV 14 to transit to the premises area. The analytics device 16 is configured to receive, responsive to the indication, the media data from the UAV 14, the media data including surveillance information associated with the premises area. In some embodiments, the media data comprises at least one of a video surveillance feed recorded by the UAV 14, and/or biometric sensor information (e.g., facial recognition information) recorded by the UAV 14.

In some embodiments, the analytics device 16 is further configured to detect (and/or determine and/or predict) the security attribute of the media data by identifying a dominant object in an image frame of the media data, determining a classification of the dominant object based at least in part on the first level of ML analysis, and mapping the classification to the security attribute based on a preconfigured security attribute mapping. For example, if a dominant object is classified as "person", and the premises area associated with the surveillance footage in the media data is a "Restricted" area where people should not be located, e.g., at certain times of day, the "person" classification, in combination with the premises area associated with the surveillance footage and/or the time of day in which the surveillance occurred, may be mapped to a security alert (e.g., "Unauthorized Access Detected in Restricted Area"). An additional classification, such as identifying the particular individual, determining and/or predicting whether the individual is an intruder or an access-authorized person, determining and/or predicting a threat level associated with a dominant object, etc., may also be performed in the first level of ML analysis. Alternatively, one or more of the above-listed analyses may be performed instead at the remote monitoring system 20, e.g., as part of the second level of ML analysis. Thus, in one example, the analytics device 16 may detect, in a first level of ML analysis, that a security alert occurred, e.g., with a 60% probability, based on a person being located in an unauthorized area recorded in UAV surveillance footage, and may transmit the surveillance footage to the remote monitoring system 20 for further processing. The remote monitoring system 20 then may utilize the second level of ML analysis to further analyze the footage, e.g., to detect and/or determine and/or predict the specific identity of the person in the surveillance footage, and to make a more refined and/or higher accuracy determination based thereon.

In some embodiments, the security attribute comprises at least one of an alarm probability level, a threat severity level indication, a priority level indication, a broken window indication, an open door indication, an intruder indication, or an identification of a person in an area of the premises. In some embodiments, the analytics device 16 is further configured to lack a configuration to notify first responders, and the remote monitoring system is configured to notify first responders based on the second level of ML analysis.

Figure 5:
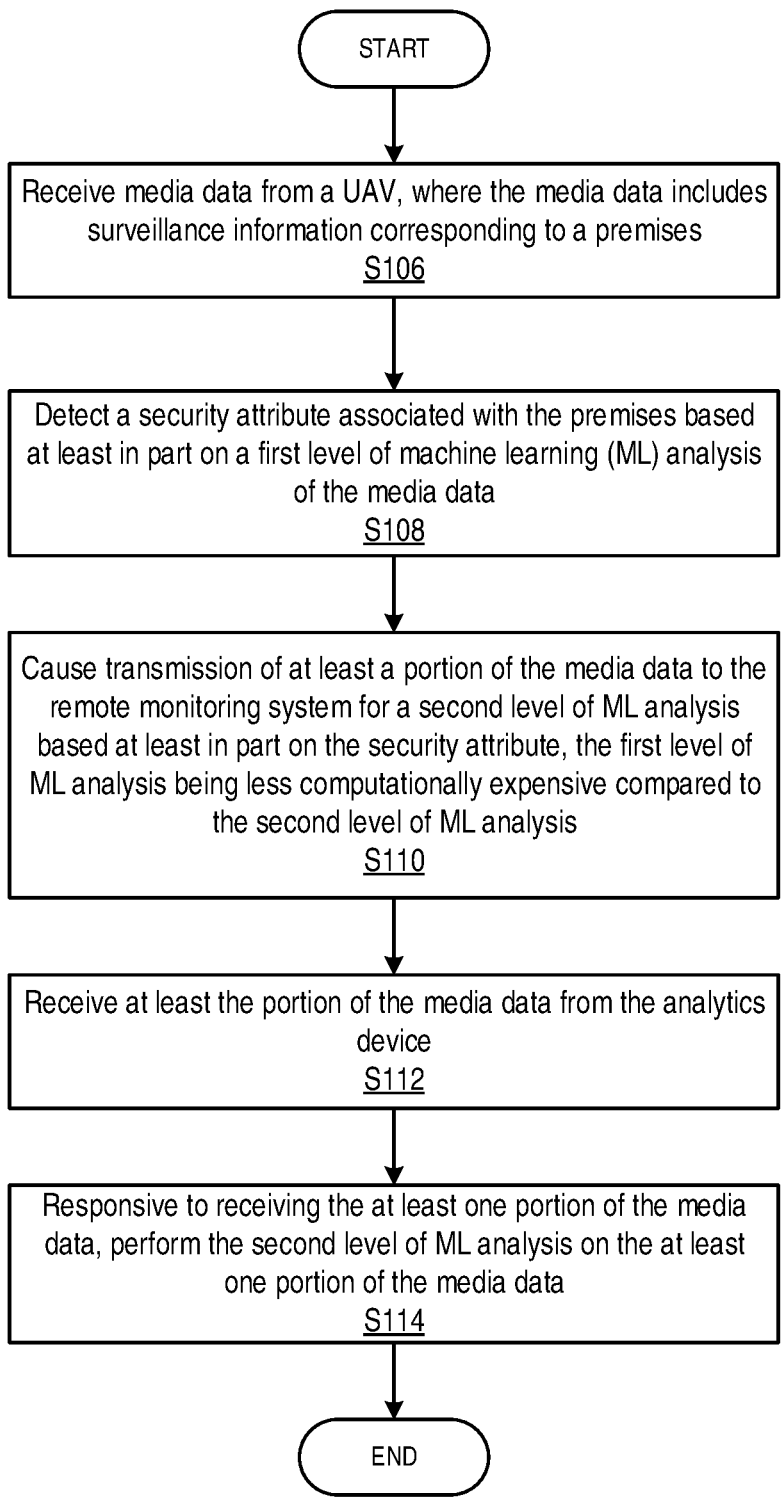
FIG. 5 is a flowchart of an example process in a system performed by the analytics device of FIG. 2 and the remote monitoring system of FIG. 3 according to various embodiments of the present disclosure.

FIG. 5 is a flowchart of an example process in a system 10, e.g., a system for security, including a distributed video surveillance system 12 including an analytics device 16 and a UAV 14, the system further including a premises security system 24 associated with a premises 26 (e.g., a distribution hub or other type of premises), the system 10 further including a remote monitoring system 20, which may be associated with a remote monitoring service 22, according to one or more embodiments. One or more blocks described herein may be performed by one or more elements of analytics device 16 such as by one or more of processing circuitry 46 (including the analytics engine 36), processor 48, etc. One or more blocks described herein may be performed by one or more elements of remote monitoring system 20 such as by one or more of processing circuitry 56 (including the remote analytics engine 38 and/or first responder verified alarm service 40), processor 58 etc. Analytics device 16 is configured to receive (Block S106) media data from a UAV 14, where the media data includes surveillance information corresponding to a premises 26 (e.g., a premises 26 associated with the premises security system 24). Analytics device 16 is configured to detect (Block 5108) a security attribute associated with the premises 26 based at least in part on a first level of machine learning (ML) analysis of the media data. Analytics device 16 is configured to cause transmission (Block S110) of at least a portion of the media data to the remote monitoring system 20 for a second level of ML analysis based at least in part on the security attribute, the first level of ML analysis being less computationally expensive compared to the second level of ML analysis.

The remote monitoring system 20 is configured to receive (Block S112) at least the portion of the media data from the analytics device 16. Responsive to receiving the at least one portion of the media data, the remote monitoring system 20 is configured to perform (Block S114) the second level of ML analysis on the at least one portion of the media data.

In some embodiments, the analytics device 16 is further configured to determine an alarm probability level associated with the security attribute, and cause transmission of the at least one portion of the media data to the remote monitoring system only when the alarm probability level exceeds a preconfigured threshold.

In some embodiments, the security attribute and/or an indication thereof may be transmitted from the analytics device 16 to the remote monitoring system 20 along with the media data, and/or may be transmitted in separate signaling.

In some embodiments, the remote monitoring system 20 is configured to receive, from the analytics device 16, an indication of the security attribute, and the second level of ML analysis comprises determining a prediction accuracy of the security attribute. In some embodiments, the remote monitoring system 20 is configured to cause transmission of an emergency alert to first responders (e.g., an emergency call service), and/or to another service, such as a remote monitoring service 22, etc., only when the prediction accuracy exceeds a preconfigured threshold. In some embodiments, the second level of ML analysis comprises detecting (and/or determining and/or predicting) an additional security attribute of the media data, and the remote monitoring system 20 is further configured to cause transmission of an emergency alert to first responders (or a remote monitoring service 22) based at least in part on the additional security attribute. Thus, for example, in some embodiments, the second level of ML analysis may include detecting smoke in UAV surveillance footage by the first level of ML analysis, and only notifying a first responder service if the remote analytics engine 38 determines with a high degree of confidence that smoke is present in the UAV 14 surveillance footage.

In some embodiments, remote monitoring system 20 is further configured to detect (and/or determine and/or predict) the additional security attribute of the media data by identifying a dominant object in an image frame of the media data, determining a classification of the dominant object, and mapping the classification to a security attribute based at least in part on a preconfigured security attribute mapping. In some embodiments, the remote monitoring system 20 is further configured to receive security information from at least one of a premises security system 24 (e.g., a premises 26 alarm), a first responder verified alarm service 40 (e.g., a remote first responder service), and/or another entity in system 10, and is configured to cause transmission of a security alert to the analytics device 16 based at least in part on the security information, the security alert indicating the premises area associated with the premises 26 monitoring. The analytics device is further configured to receive the security alert from the remote monitoring system 20 indicating the premises area associated with the premises 26 for monitoring. Responsive to receiving the security alert, the analytics device 16 is configured to cause transmission of an indication to the UAV 14 for the UAV 14 to transit to the premises area. The analytics device 16 is configured to receive, responsive to the indication, the media data from the UAV 14, the media data including surveillance information associated with the premises area. In some embodiments, the media data comprises at least one of a video surveillance feed recorded by the UAV 14, or biometric sensor information recorded by the UAV 14. In some embodiments, the security attribute comprises at least one of an alarm probability level, a threat severity level indication, a priority level indication, a broken window indication, an open door indication, an intruder indication, or an identification of a person in an area of a premises associated with the premises security system.

The concepts described herein may be embodied as methods, data processing systems, computer program products and/or computer storage media storing executable computer programs. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings.

What is claimed:

1. An analytics device for an unmanned aerial vehicle (UAV), the analytics device being configured to communicate with a remote monitoring system and the UAV, the analytics device comprising processing circuitry configured to:
   receive media data from the UAV, the media data comprising surveillance information corresponding to a premises;
   detect a security attribute associated with the premises based at least in part on a first level of machine learning (ML) analysis of the media data; and
   cause transmission of at least a portion of the media data to the remote monitoring system for a second level of ML analysis based at least in part on the security attribute, the first level of ML analysis being less computationally expensive compared to the second level of ML analysis.

2. The analytics device of claim 1, wherein the processing circuitry is further configured to:
   determine an alarm probability level associated with the security attribute; and
   transmit at least the portion of the media data to the remote monitoring system only when the alarm probability level exceeds a preconfigured threshold.

3. The analytics device of claim 1, wherein processing circuitry is further configured to:
   receive a security alert from the remote monitoring system indicating a premises area associated with the premises;
   responsive to receiving the security alert, cause transmission of an indication to the UAV for the UAV to transit to the premises area; and
   receive, responsive to the indication, the media data from the UAV, the media data including surveillance information associated with the premises area.

4. The analytics device of claim 1, wherein the media data comprises at least one of:
   a video surveillance feed recorded by the UAV; or
   biometric sensor information recorded by the UAV.

5. The analytics device of claim 1, wherein the processing circuitry is further configured to detect the security attribute of the media data by:
   identifying a dominant object in an image frame of the media data;
   determining a classification of the dominant object based on the first level of ML analysis; and
   mapping the classification to the security attribute based on a preconfigured security attribute mapping.

6. The analytics device of claim 1, wherein the security attribute comprises at least one of:
   an alarm probability level;
   a threat severity level indication;
   a priority level indication;
   a broken window indication;
   an open door indication;
   an intruder indication; or
   an identification of a person in a premises area.

7. The analytics device of claim 1, wherein the analytics device lacks a configuration for notifying first responders and the remote monitoring system has a configuration for notifying first responders based on the second level of ML analysis.

8. A system for security comprising:
   an unmanned aerial vehicle (UAV);
   an analytics device being configured to communicate with a remote monitoring system and the UAV, the analytics device comprising processing circuitry configured to:
      receive media data from the UAV, the media data comprising surveillance information corresponding to a premises;
      detect a security attribute associated with the premises based at least in part on a first level of machine learning (ML) analysis of the media data; and
      cause transmission of at least a portion of the media data to the remote monitoring system for a second level of ML analysis based at least in part on the security attribute, the first level of ML analysis being less computationally expensive compared to the second level of ML analysis; and the remote monitoring system comprising processing circuitry configured to:
  receive at least the portion of the media data from the analytics device; and
  responsive to receiving at least the portion of the media data, perform the second level of ML analysis on at least the portion of the media data.

9. The system of claim 8, wherein the processing circuitry of the analytics device is further configured to:
  determine an alarm probability level associated with the security attribute; and
  cause transmission of at least the portion of the media data to the remote monitoring system only when the alarm probability level exceeds a preconfigured threshold.

10. The system of claim 8, wherein the processing circuitry of the remote monitoring system is further configured to receive, from the analytics device, an indication of the security attribute; and
  the second level of ML analysis comprises determining a prediction accuracy of the security attribute.

11. The system of claim 10, wherein the processing circuitry of the remote monitoring system is further configured to:
  cause transmission of an emergency alert to first responders only when the prediction accuracy exceeds a preconfigured threshold.

12. The system of claim 8, wherein the second level of ML analysis comprises detecting an additional security attribute associated with the premises based at least in part on the media data; and
  the processing circuitry of the remote monitoring system is further configured to cause transmission of an emergency alert to first responders based at least in part on the additional security attribute.

13. The system of claim 12, wherein the processing circuitry of the remote monitoring system is further configured to detect the additional security attribute by:
  identifying a dominant object in an image frame of the media data;
  determining a classification of the dominant object; and
  mapping the classification to the additional security attribute based on a preconfigured security attribute mapping.

14. The system of claim 8, wherein the processing circuitry of the remote monitoring system is further configured to:
  receive security information from at least one of a premises security system or a remote first responder service; and
  cause transmission of a security alert to the analytics device based at least in part on the security information, the security alert indicating a premises area associated with the premises for monitoring; and
  the processing circuitry of the analytics device is further configured to:
  receive the security alert from the remote monitoring system indicating the premises area associated with the premises for monitoring;
  responsive to receiving the security alert, cause transmission of an indication to the UAV for the UAV to transit to the premises area; and
  receive, responsive to the indication, the media data from the UAV, the media data comprising surveillance information associated with the premises area.

15. The system of claim 8, wherein the media data comprises at least one of:
  a video surveillance feed recorded by the UAV; or
  biometric sensor information recorded by the UAV.

16. The system of claim 8, wherein the security attribute comprises at least one of:
  an alarm probability level;
  a threat severity level indication;
  a priority level indication;
  a broken window indication;
  an open door indication;
  an intruder indication; or
  an identification of a person in a premises area.

17. A method implemented by a system for security comprising an unmanned aerial vehicle (UAV), an analytics device being configured to communicate with a remote monitoring system and the UAV, the method comprising:
  receiving, at the analytics device, media data from the UAV, the media data comprising surveillance information corresponding to a premises;
  detecting, at the analytics device, a security attribute associated with the premises based at least in part on a first level of machine learning (ML) analysis of the media data;
  causing transmission, from the analytics device, of at least a portion of the media data to the remote monitoring system for a second level of ML analysis based at least in part on the security attribute, the first level of ML analysis being less computationally expensive compared to the second level of ML analysis;
  receiving, at the remote monitoring system, at least the portion of the media data from the analytics device; and
  responsive to receiving at least the portion of the media data, performing, at the remote monitoring system, the second level of ML analysis on at least the portion of the media data.

18. The method of claim 17, wherein the method further comprises:
  determining, at the analytics device, an alarm probability level associated with the security attribute; and
  causing transmission, from the analytics device, of at least the portion of the media data to the remote monitoring system only when the alarm probability level exceeds a preconfigured threshold.

19. The method of claim 17, wherein the method further comprises receiving, at the remote monitoring system, an indication of the security attribute; and
  the second level of ML analysis comprises determining a prediction accuracy of the security attribute.

20. The method of claim 17, wherein the second level of ML analysis comprises detecting, at the remote monitoring system, an additional security attribute associated with the premises based at least in part on the media data; and
  the method further comprises causing transmission, from the remote monitoring system, of an emergency alert to first responders based at least in part on the additional security attribute.

* * * * *